(12) United States Patent
Forsse

(10) Patent No.: US 7,210,999 B2
(45) Date of Patent: *May 1, 2007

(54) INTERACTIVE BINDER AND PLATFORM SYSTEM

(76) Inventor: Ken Forsse, 34341 Amber Lantern St., Dana Point, CA (US) 92629-3011

( * ) Notice: Subject to any disclaimer, the term of this patent is extended or adjusted under 35 U.S.C. 154(b) by 326 days.

This patent is subject to a terminal disclaimer.

(21) Appl. No.: 10/821,622

(22) Filed: Apr. 8, 2004

(65) Prior Publication Data

US 2004/0224767 A1 Nov. 11, 2004

Related U.S. Application Data

(60) Provisional application No. 60/461,857, filed on Apr. 9, 2003.

(51) Int. Cl.
*A63F 13/00* (2006.01)

(52) U.S. Cl. ....................................................... 463/37

(58) Field of Classification Search ............ 463/30–31, 463/35–37, 39, 40, 42, 43; 434/317
See application file for complete search history.

(56) References Cited

U.S. PATENT DOCUMENTS 5,807,176 A * 9/1998 Forsse et al. ................. 463/37
2002/0008690 A1 * 1/2002 Cooper ........................ 345/156

* cited by examiner

*Primary Examiner*—Kim Nguyen
(74) *Attorney, Agent, or Firm*—Kelly Lowry & Kelley, LLP

(57) ABSTRACT

An interactive binder and platform system includes a remote multimedia source, a feedback unit electronically connected to the remote multimedia source, and a plurality of binders. Each binder includes a plurality of conductive pins and at least one fixed medium having a plurality of distinct circuits operatively connected to the binder and a plurality of touch points defining exposed portions of the distinct circuits. A transceiver electronically connected to at least one of the binders provides power to the at least one of the binders and transmits/receives signals to provide two-way communication between the remote multimedia source and the binders where selection of a particular touch point by a user electronically connects the distinct circuit associated with the particular touch point and the remote multimedia source, the output from the remote multimedia source associated with input sent to the remote media source by the selection of the particular touch point.

33 Claims, 10 Drawing Sheets

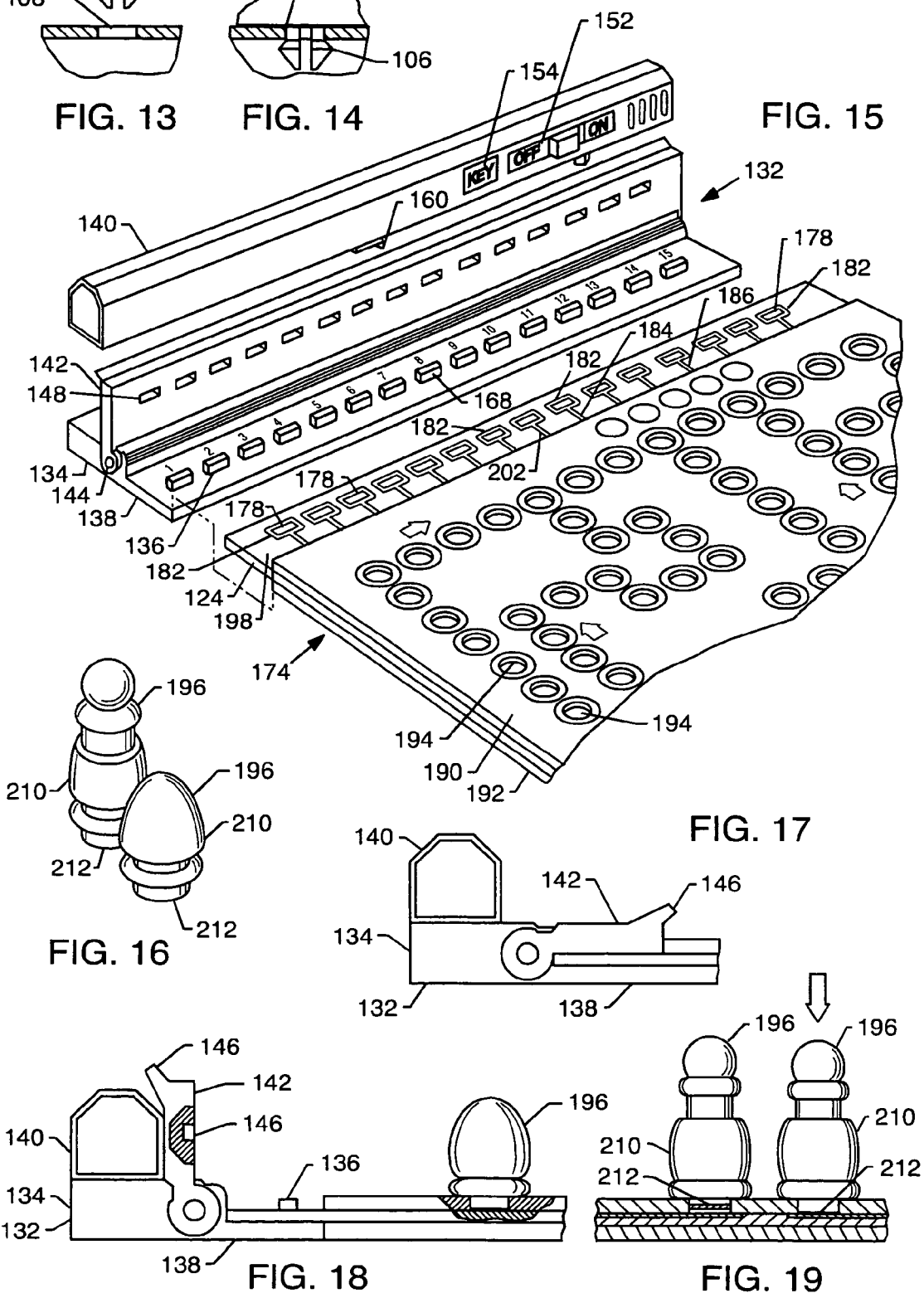

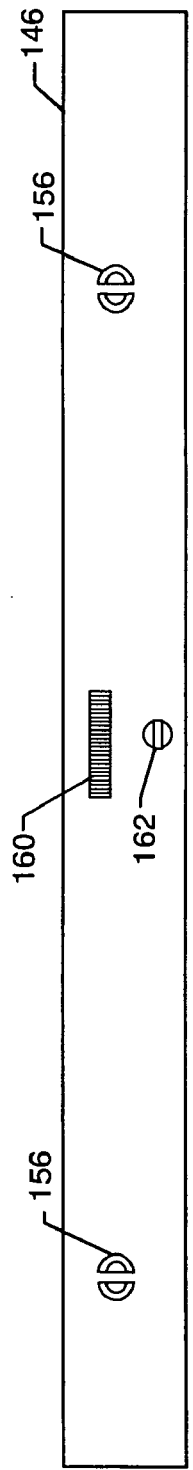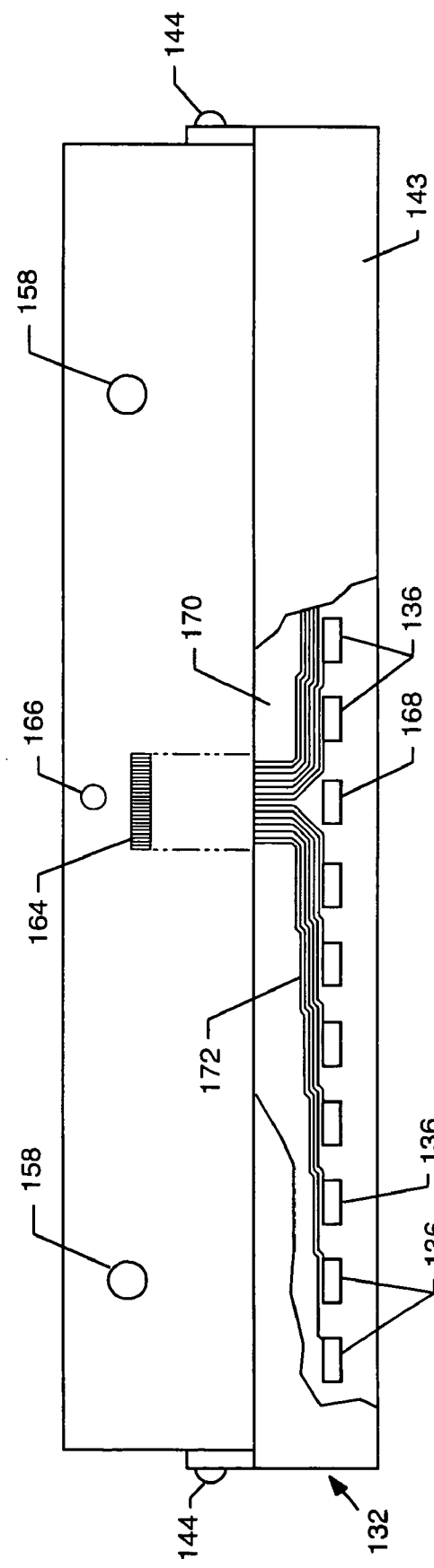

INTERACTIVE BINDER AND PLATFORM SYSTEM

RELATED APPLICATION

This application claims priority to U.S. provisional application Ser. No. 60/461,857, filed Apr. 9, 2003.

BACKGROUND OF THE INVENTION

This invention relates generally to means for accessing audio and video information from multimedia sources. More specifically, the present invention relates to an interactive binder/platform wherein tactile input is translated into an electronic signal which is transmitted to a multimedia source which provides output in response to the tactile input.

The widespread availability and use of personal computers has revolutionized information management worldwide. With improvements in computer memory and speed, applications are being developed which enable tasks to be performed today which only a few short years ago could be accomplished only through the use of large, main-frame computers. Computers are routinely utilized for tasks such as word processing, accounting, inventory control and desktop publishing, as well as a myriad of other uses. Increasingly, CD-ROM drives are incorporated into personal computing work stations, primarily because CD-ROM disks are capable of storing a great deal of information which may be accessed quickly.

Many tasks and operations which were formerly accomplished utilizing books, manuals, writing paper and/or boards, are now routinely accomplished by means of the personal computer, wherein interactivity between the information of a software program and the user is accomplished by means of a display screen and one of several available input devices, including a keyboard and a mouse. While such interactivity is acceptable in many applications, there are others where a more conventional tactile-type input remote from the computer would be preferable.

For example, many people are far more comfortable with books than with a computer screen. Such people usually prefer to read information from a tangible page than from the screen of a computer. Often such is the case when one has the task of learning a great deal of information such as in school studies. Further, while many may find the visual display of a computer satisfactory, it is well known that some types of learning are far better if some type of direct tactile feedback is available. In this regard younger children, while they may benefit from the modern technology found in today's computers, often find it quite difficult to respond to inquiries posed by the computer through a keyboard or a mouse. There is, therefore, the need for some type of input device which provides an appropriate feedback channel that may be actuated through tactile-type input.

Another example is in the realm of games, whether such games are structured purely for pleasure or have an educational aspect. While many games can be played on a computer utilizing nothing more than the keyboard and a mouse, some computer game enthusiasts still prefer something akin to a normal game board wherein games pieces may be moved from one spot to another as play progresses. Even under such circumstances a computer could be utilized to increase the complexity of the game and automatically keep score and remind players of the proper play order and rules if a suitable tie-in where available between a game board and the computer.

U.S. Pat. No. 5,807,176 discloses a station for providing interactivity with a multimedia source, such as a computer or CD-ROM player, which can be advantageously utilized to provide convenient tactile input to the multimedia source either as part of a game or in response to a printed or computer-generated inquiry. However, this system is limited in that there is only one-way communication from the station to the multimedia source and no feedback from the multimedia source back to the station.

Accordingly, there is a continuing need for an interactive binder and platform system that serves as an exciting and informative book. There is an additional need for an interactive binder and platform system that includes "free-standing" volumes that can be filled with colorful graphics, valuable information and challenges. There is a further need for an interactive binder and platform system that is a separate repository for information. There is also a need for an interactive binder and platform system that can be used in school settings to teach and test students, incorporate games, and serve as an audio device as well as a visual device. There is a need for an interactive binder and platform system that provides two-way communication between the binder and a multimedia source. There is also a need for an interactive binder and platform system that can serve as a catalog that a user can fully browse by flipping the pages, and, when fascinated by a product, the user can touch a single dot in the binder to connect to the Internet and access audio and video supplements and subsequently make purchases. The present invention fulfills these needs and provides other related advantages.

SUMMARY OF THE INVENTION

The present invention resides in a system for providing remote interactivity between the user and a remote multimedia source, such as a computer or CD-ROM player, utilizing tactile input to the multimedia source either as part of a game or in response to a printed or computer-generated inquiry.

In one embodiment of the present invention, an interactive binder and platform system includes a remote multimedia source, a feedback unit electronically connected to the remote multimedia source for displaying output from the remote multimedia source, and a plurality of binders. Each binder includes a plurality of conductive pins and at least one fixed medium having a plurality of distinct circuits operatively connected to the binder and a plurality of touch points defining exposed portions of the distinct circuits.

At least one transceiver is electronically connected to at least one of the binders, for providing power to the at least one of the binders and transmitting/receiving signals to provide two-way communication between the remote multimedia source and the binders such that selection of a particular touch point by a user electronically connects the distinct circuit associated with the particular touch point and the remote multimedia source, the output from the remote multimedia source associated with input sent to the remote media source by the selection of the particular touch point.

The fixed medium comprises a plurality of apertures corresponding to the plurality of conductive pins. Each aperture is at least partially surrounded by a conductive contact pad that engages a respective pin inserted through the aperture. The fixed medium also comprises interactive paper having the distinct circuits and power circuits printed therein. The at least one fixed medium is removable from the binder. The fixed medium includes indicia associated with each touch point. The fixed medium further comprises includes a printed circuit board and an overlying laminate having apertures therethrough corresponding to at least one of the plurality of touch points. The fixed medium may also include an underlying laminate adjacent to the printed circuit board opposite the overlying laminate, the underlying laminate including apertures corresponding to at least one of the plurality of touch points.

The system also includes a conductive tip for contacting at least one of the touch points in response to indicia on the feedback unit.

The binder includes a hinged lid adjacent to the plurality of conductive pins. The hinged lid includes a plurality of recesses corresponding to upper ends of the plurality of conductive pins and is pivotable between an open position and a closed position where the upper ends of the plurality of conductive pins are captured within the plurality of recesses of the lid.

The transceiver and remote multimedia source are preferably operationally connected through a wireless local access network.

The feedback unit comprises a wall display electronically connected to the remote multimedia source and at least one binder. The feedback unit may also comprise a binder display, electronically connected to the transceiver, for displaying output from the multimedia source. The feedback unit may include both the wall display and the binder display; the binder display providing a message relating to the touch point selected by the user in response to indicia shown on the wall display.

The remote multimedia source typically includes a computer. The computer may be electronically connected to a website. The remote multimedia source may also include a CD-ROM player.

The system includes a conductive tip for contacting at least one of the touch points in response to indicia on the wall display. The indicia includes a first graphic generated by the remote media source and appears on the wall display; the binder display showing a text message indicating whether or not the at least one of the touch points is associated with the first graphic.

The first graphic can be in any number of forms including, among other things, an animation or a streaming video. A second graphic can be in the form of a countdown timer graphic indicating the time remaining for a user to contact at least one of the touch points in response to the indicia.

The transceiver can be electronically connected to the binder(s) in the system in a number of way. For example, the at least one transceiver can electronically connected to all of the binders or to a particular one of the binders with the remaining binders electronically connected to the particular one of the binders. Additionally, each binder may be electronically connected to a particular transceiver.

In accordance with another embodiment of the present invention, an interactive binder and platform system includes a remote multimedia source, a feedback unit electronically connected to the remote multimedia source for displaying output from the remote multimedia source, an instructor binder electronically connected to the remote multimedia source and at least one student binder electronically connected to the remote multimedia source. Each instructor and student binder is electronically connected to the remote multimedia source through a wireless local access network.

Each binder includes a plurality of conductive pins and at least one fixed medium having a plurality of distinct circuits operatively connected to the binder and a plurality of touch points defining exposed portions of the distinct circuits.

At least one transceiver is electronically connected to the instructor binder and the at least one student binder, for providing power to the at least one of the binders and transmitting/receiving signals to provide two-way communication between the remote multimedia source and the binders such that selection of a particular touch point by a user electronically connects the distinct circuit associated with the particular touch point and the remote multimedia source, the output from the remote multimedia source associated with input sent to the remote media source by the selection of the particular touch point.

The fixed medium includes interactive paper having the distinct circuits and power circuits printed therein.

The system includes a track ball electronically connected to the instructor binder for manipulating the remote multimedia source.

The feedback unit comprises a wall display electronically connected to the remote multimedia source and at least one of the binders. The feedback unit also includes a binder display, electronically connected to the transceiver, for displaying output from the multimedia source. The binder display provides a message relating to the touch point selected by the user in response to indicia shown on the wall display. The feedback unit is electronically connected to the transceiver for displaying output from the multimedia source.

The system further includes a conductive tip for contacting at least one of the touch points in response to indicia on the wall display. The indicia includes a first graphic generated by the remote media source and appearing on the wall display, and the binder display shows a text message indicating whether or not the at least one of the touch points is associated with the first graphic. The system includes a second graphic including a countdown timer graphic indicating time remaining for a user to contact at least one of the touch points in response to the indicia.

The at least one transceiver comprises a plurality of transceivers and each transceiver is electronically connected to a particular one of the plurality of binders.

In accordance with yet another embodiment of the present invention, an interactive binder and platform system includes a remote multimedia source, a feedback unit electronically connected to the remote multimedia source for displaying output from the remote multimedia source, and a plurality of binders electronically connected to each other. Each binder including a plurality of conductive pins and at least one fixed medium having a plurality of distinct circuits operatively connected to the binder and a plurality of touch points defining exposed portions of the distinct circuits.

At least one transceiver is electronically connected to all of the binders and mechanically connected to only one of the binders, for providing power to the at least one of the binders and transmitting/receiving signals to provide two-way communication between the remote multimedia source and the binders such that selection of a particular touch point by a user electronically connects the distinct circuit associated with the particular touch point and the remote multimedia source, the output from the remote multimedia source associated with input sent to the remote media source by the selection of the particular touch point, each touch point located within a particular one of a plurality of apertures of the fixed medium.

The system further includes a plurality of play pieces, each play piece associated with a particular one of the binders and at least partially positionable within one of the apertures of the fixed medium, the play piece including a conductive tip configured to engage the underlying touch point to complete the distinct circuit of the touch point.

The fixed medium includes a printed circuit board and an overlying laminate having apertures therethrough corresponding to at least one of the plurality of touch points. The fixed medium also includes an underlying laminate adjacent to the printed circuit board opposite the overlying laminate, the underlying laminate including the apertures corresponding to at least one of the plurality of touch points. The at least one fixed medium may be in the form of a game board including indicia.

An audio means is operatively connected to the transceiver for receiving audio signals from the remote multimedia source.

The feedback unit may include a computer monitor electronically connected to the remote multimedia source. The feedback unit may also include a robotic stage, electronically connected to the transceiver, for providing output from the multimedia source.

The robotic stage includes at least one display for each binder for providing a graphical output from the remote multimedia source. The robotic stage also includes at least one speaker for providing an audio output from the remote multimedia source. The robotic stage further includes at least one means for emitting an odor in response to output from the remote multimedia source.

Other features of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 13 illustrates an enlarged, fragmented and partially sectional view illustrating alignment of a split snap-on connector of a transceiver with a corresponding receiving aperture provided in a binder;

FIG. 14 illustrates a view similar to that shown in FIG. 13, wherein the transceiver unit is fixed to the binder by means of the split snap-on connector;

FIG. 15 illustrates a view of fragmented exploded perspective view of another type of binder, transceiver and game board embodying the present invention;

FIG. 16 illustrates a perspective view of two exemplary play pieces utilized with the game board of FIG. 15;

FIG. 17 illustrates a fragmented, partially sectional elevational view of the binder and transceiver of FIG. 15, illustrating a board properly placed relative to the binder, and a binder lid in its closed configuration;

FIG. 18 illustrates a fragmented, partially sectional elevational view of the binder and transceiver of FIG. 15, illustrating a board properly placed relative to the binder, and a binder lid in its open configuration;

FIG. 19 illustrates a fragmented, partially sectional elevational view of two identical play pieces mounted in adjacent apertures of the board, wherein one of the play pieces is shown depressed so as to make contact between a conductive tip of the play piece and an underlying touch point provided in the board;

FIG. 23 is a bottom plan view of a transmitter taken generally along the line 23—23 of FIG. 15; and FIG. 24 is a top plan view of the platform taken generally along the line 24—24 of FIG. 15.

DETAILED DESCRIPTION OF THE PREFERRED EMBODIMENTS

Figure 1:
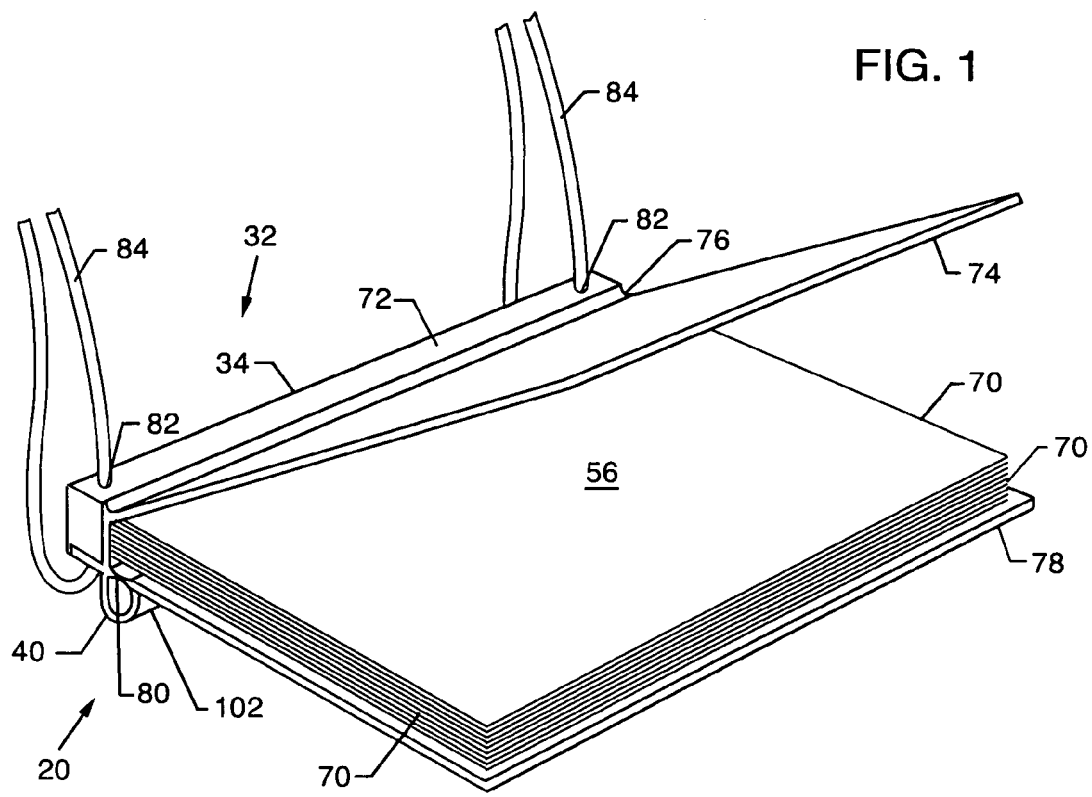
FIG. 1 illustrates an orthogonal view of a binder and transceiver for providing remote interactivity with a multimedia source, embodying the invention, wherein a front cover of the binder is depicted as being partially open to expose interactive paper and exemplary shoulder straps are shown.
Figure 2:
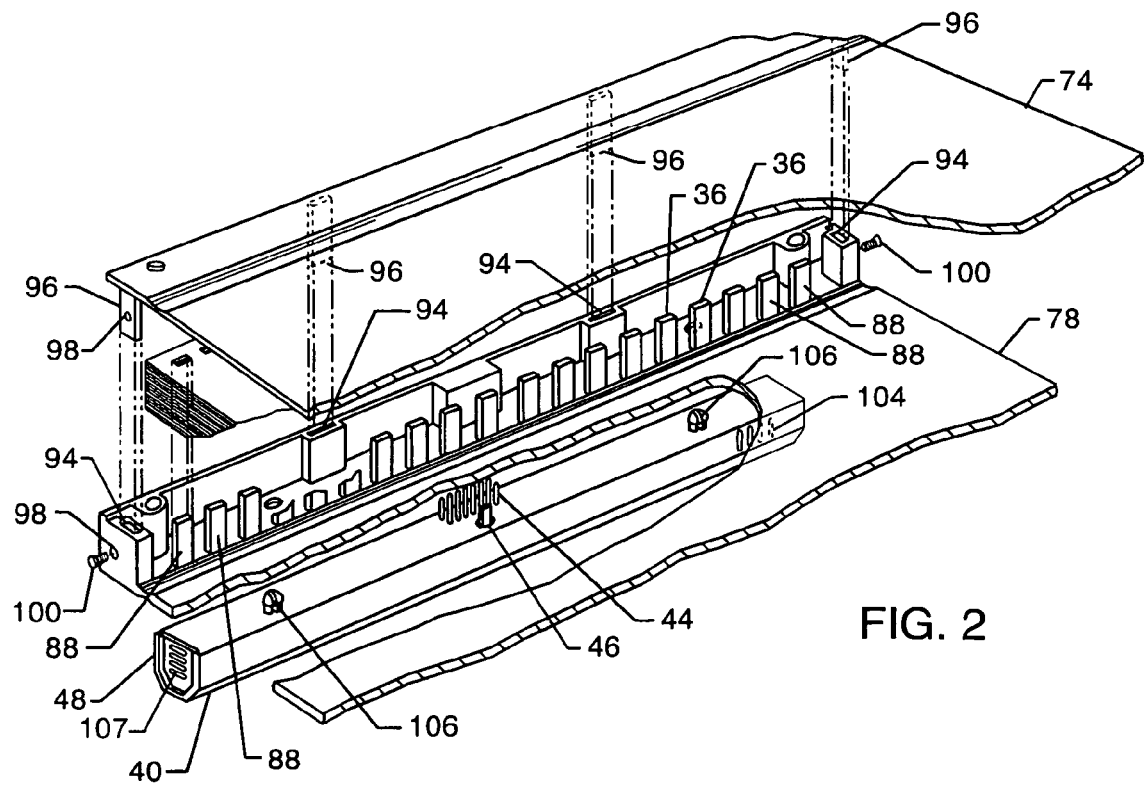
FIG. 2 illustrates an enlarged, fragmented exploded perspective view of the binder and transceiver of FIG. 1, wherein the interactive paper has been removed.
Figure 3:
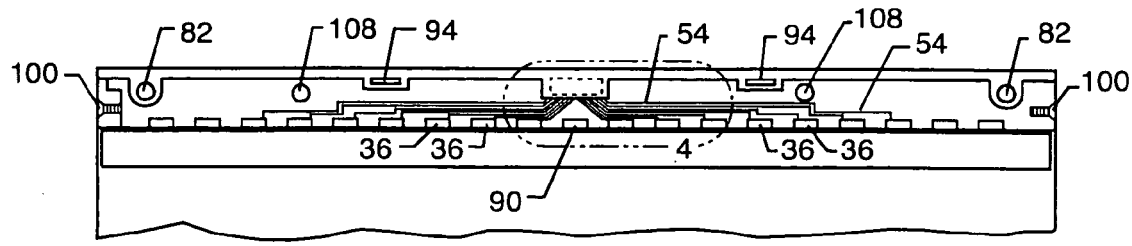
FIG. 3 illustrates an enlarged, fragmented top plan view of the binder and rear cover, taken generally along the line 3—3 of FIG. 2.

As shown in the drawings for purposes of illustration, the present invention is concerned with an interactive binder and platform system 30. As seen in FIG. 1–14, a first embodiment of the present invention includes a number of electronic binders 32. Each binder 32 includes a platform 34 which includes a plurality of conductive pins 36 that extend from a platform housing 38.

A transceiver unit 40 is provided which is removably attachable to the platform housing 38. The transceiver unit 40 provides power to the binder 32 and transmits between the binder 32 and a remote multimedia source 42. More particularly, the transceiver unit 40 includes a multi-pin connector 44 and a power plug 46 which extend from a housing 48 for the transceiver unit. The platform 34 of the binder 32 includes receptacles 50, 52 for the multi-pin connector 44 and the power plug 46, respectively. The platform 34 also includes distinct pin connection lines 54 which extend from the conductive pins 36 to the receptacles 50, 52 for the multi-pin connector 44 and the power plug 46.

At least one fixed, preferably planar, medium 56 is removably attached to the platform 34 to connect a plurality of distinct circuits 58 to the platform 34 through the conductive pins 36. A plurality of touch points 60 define exposed portions of the distinct circuits 58. The planar medium 56 includes a plurality of apertures 62 which correspond to position and orientation of the conductive pins 36. Each aperture 62 is at least partially surrounded by a conductive contact pad 64 that engages a respective pin 36 when the pin 36 is inserted through the aperture 62. The planar medium 56 further includes the distinct circuits 58 which include printed power 66 and output circuits 68 therein. The touch points 60 indicate where the distinct circuits 56 can be completed when the touch points are contacted by a conductive object to close the circuit. Fixed medium 56 can be added to or removed from the binder 32.

The planar medium 56 takes the form of a plurality of sheets of interactive paper 70 which are bound along one edge between the platform housing 38 and a housing cover 72. A front page cover 74 is attached to the housing cover 72 by means of a first flexible hinge 76, and a back page cover 78 is attached to the platform 34 by means of a second flexible hinge 80. The binder 32 has the general appearance of a book or looseleaf binder, wherein the pages of interactive paper 70 lie adjacent to one another between the front 74 and back page covers 78. Apertures 82 are provided through, respectively, the housing cover 72 and the platform 34 to enable the binder 32 to be fitted with shoulder straps 84. The planar medium 56 may be single-sided or double-sided (i.e., touch points 60 and associated indicia on both sides of the paper 70).

Figure 4:
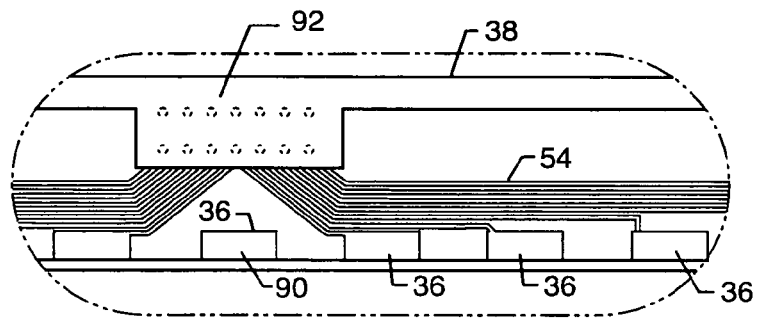
FIG. 4 illustrates an enlarged, fragmented top plan view taken generally of the area indicated by the number 4 in FIG. 3.

The platform 34 comprises a molded component that supports nineteen equidistantly spaced pins 86. The two pins at each end of the platform 34 are non-conductive pins 88, and the remaining fifteen pins are the conductive pins 36 mentioned above. A central pin 90 of the conductive pins 36 is a power pin through which power is supplied to the interactive paper 70 in a manner to be discussed more fully below. As shown in FIG. 4, distinct pin connection lines 54 extend from each of the remaining conductive pins 36 to a circuit output housing 92 which defines the receptacle 50 for the multi-pin connector 44.

In order to align the housing cover 72 with the platform 34 and secure it thereto, the platform 34 includes four register slots 94 which are designed to receive corresponding register pins 96 that extend from the housing cover 72. The register slots 94 and register pins 96 at the ends of the platform 34 include aligned apertures 98 through which a screw 100 may be threaded to securely attach the housing cover 72 to the platform 34.

The transceiver unit 40 is designed to be interchangeably utilized with different sizes and types of binders 32. The transceiver unit 40 includes a housing 102 for a pair of batteries (not shown) (rechargeable or non-rechargeable), an electronic transmitter (not shown), an electronic receiver (not shown) and a beeper 104. One end of the transceiver unit housing 102 includes a battery door 107 that may be removed and replaced as necessary to change the batteries. The multi-pin connector 44 and the power plug 46 extend from one side of the transceiver unit housing 102 and are configured for insertion into the corresponding receptacles 50, 52 of the platform 34 when a pair of split snap-on connectors 106 or the like, also extending from the transmitter unit housing 102, are aligned with and inserted into corresponding snap-on connector receiving apertures 108 provided in the platform housing 38 (See FIGS. 18 and 19). When the transceiver unit 40 is so connected to the platform 34, the power plug 46 transmits electricity from the power source to the central pin 90. Similarly, the multi-pin connector 44 connects the transmitter and receiver within the transceiver unit 40 to the remaining fourteen conductive pins 36 through the circuit output housing 92 and the pin connection lines 54.

Figure 5:
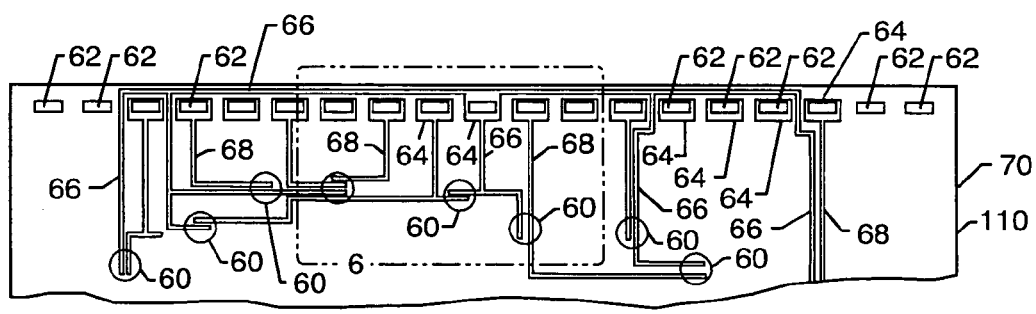
FIG. 5 illustrates a fragmented top plan view of a portion of a piece of interactive paper utilized in the binder of FIG. 1.
Figure 6:
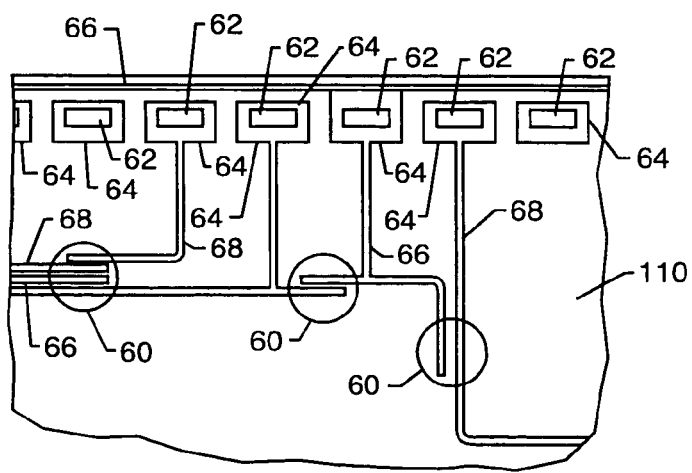
FIG. 6 illustrates an enlarged, fragmented top plan view of the area indicated by the number 6 of FIG. 5.
Figure 7:
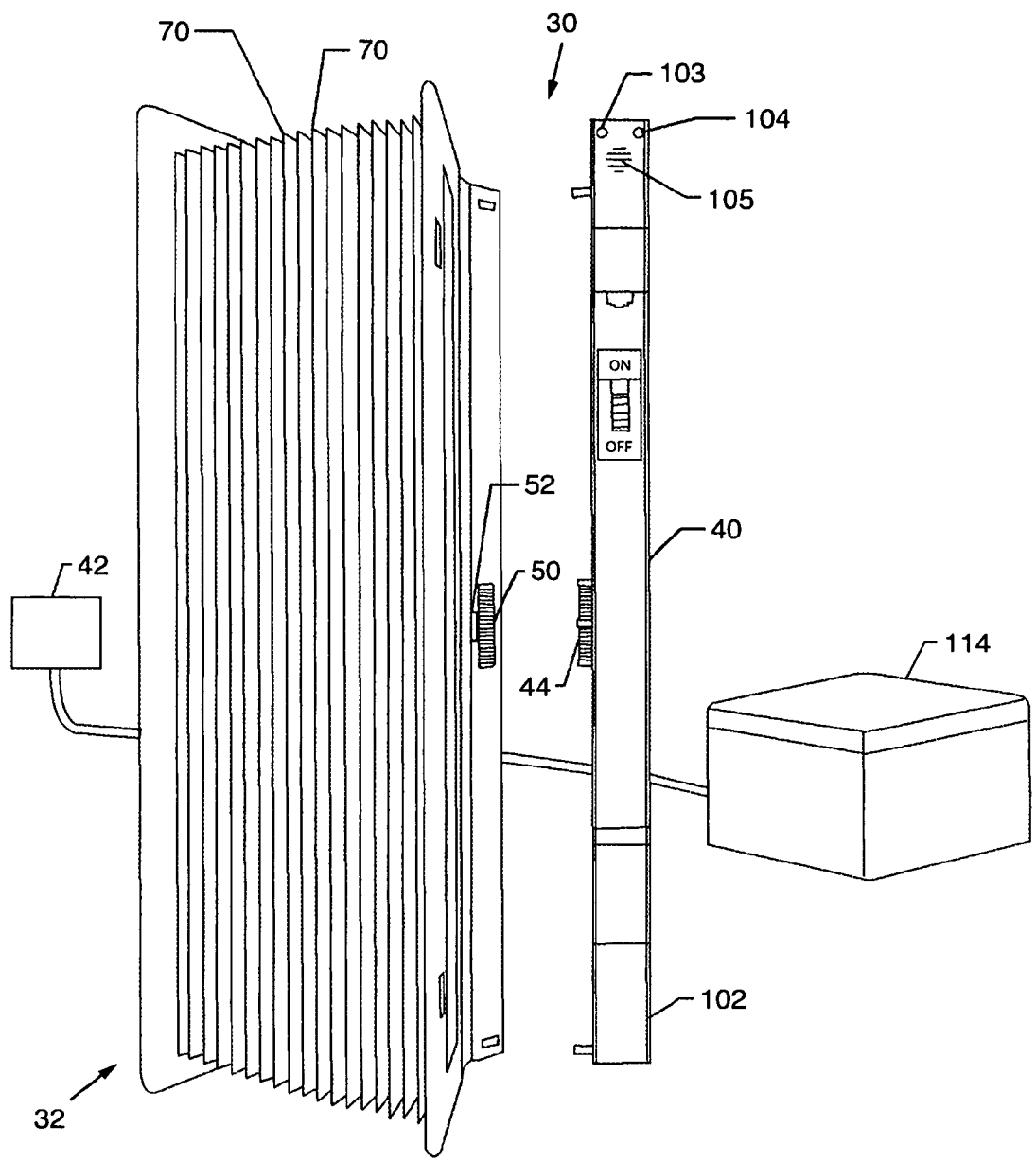
FIG. 7 illustrates an orthogonal exploded view of the binder and transceiver of FIG. 1 and LAN Hub establishing a remote link between the binder and remote multimedia source embodying the present invention.
Figure 8:
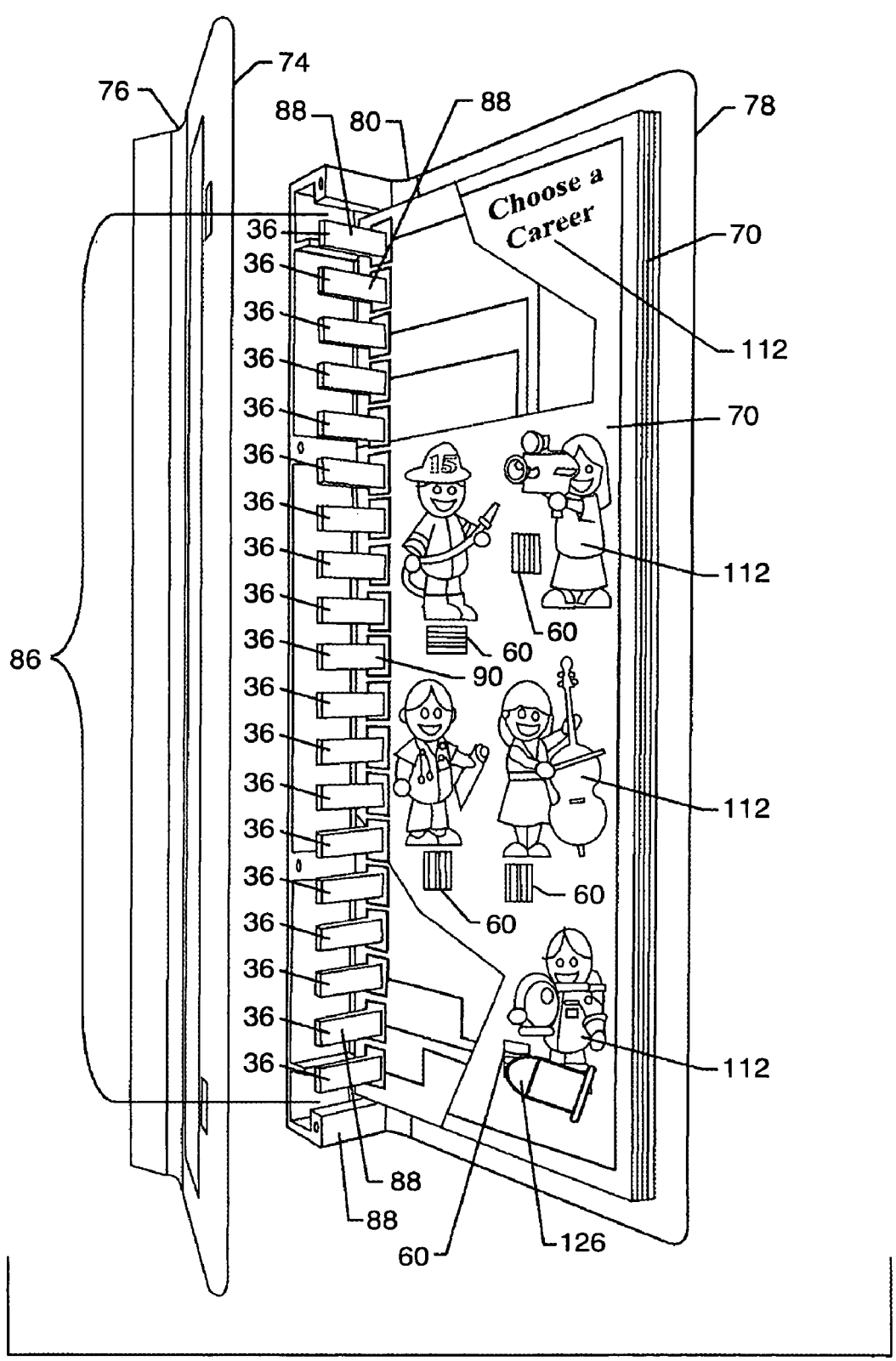
FIG. 8 illustrates an orthogonal exploded view of the binder of FIG. 1 showing conductive pins of the binder and conductive pads, circuits and indicia of the interactive paper.
Figures 9, 10:
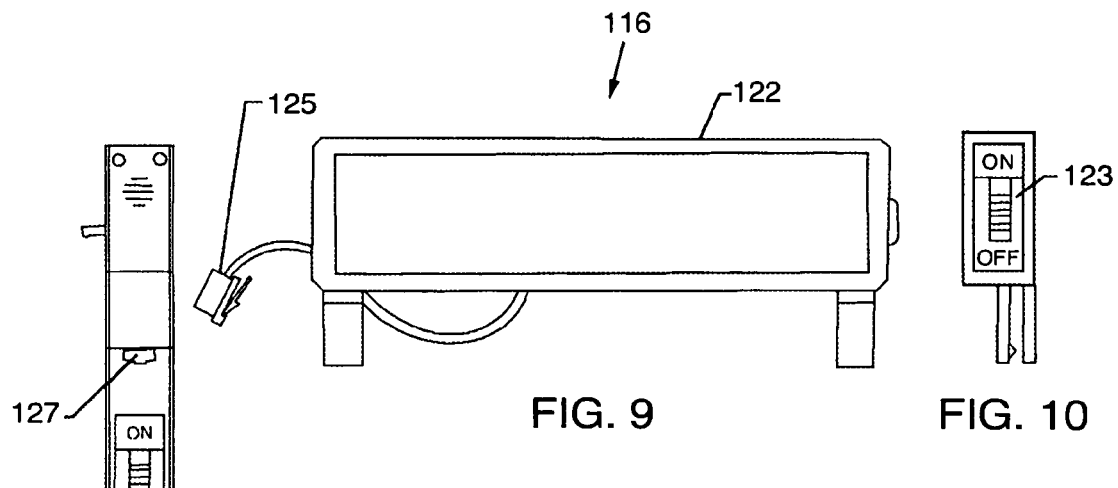
FIG. 9 illustrates the transceiver of FIG. 1 with a jack and a binder display with a plug for connection to the transceiver.
FIG. 10 illustrates a side view of the binder display of FIG. 9.
Figure 11:
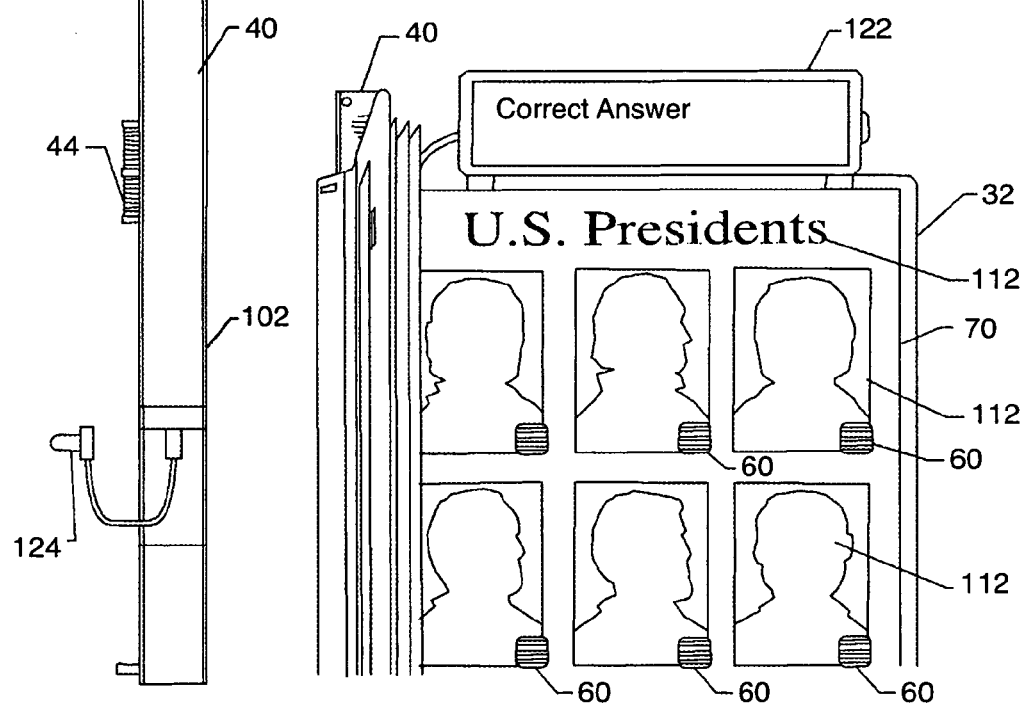
FIG. 11 illustrates a top plan view of a binder, transceiver, binder display and interactive paper embodying the present invention.

With reference to FIGS. 5, 6 and 8, the interactive paper 70 includes conductive contact pads 64 which are rectangular spots of invisible conductive material that are over-printed on a base sheet material 110 at the location of each aperture 62. Thus, as the interactive paper 70 is mated with the platform 34 by passing the conductive pins 36 through the apertures 62, the conductive pins 36 make contact with the conductive contact pads 64. The interactive paper 70 further includes thin printed lines of conductive material which lead from the conductive contact pads 64 to the small touch points 60. The touch points 60 may be circular, rectangular, or any polygonal shape. These thin printed lines comprise the power circuit 66 and the output circuits 68. The power circuit 66 extends from the conductive contact pad 64 adjacent to the central pin 90. The output circuit 68 extends from various selected ones of the remaining conductive pins 36.

The touch points 60 can be anywhere on a page of the interactive paper 70 and adjacent to indicia (e.g., text, graphic images of all kinds, etc.) 112 printed on the base sheet material 110. The power and output circuits 66, 68 are exposed at the touch points 60 so that as a person touches one of the touch points 64 with a finger, bare or preferably covered with a conductive material, one of the distinct circuits 58 is completed and a signal is transmitted through the platform 34 to the transceiver unit 40, which then transmits a signal through a wireless local access network (LAN) hub 114 to a selected type of remote multimedia component or source 42, such as a CD-ROM player or computer containing software, data, etc. The computer may also be electronically connected to a website containing software, data, etc. Thus, audio, video or data-based information may be instantly accessed and displayed to support the indicia 112 on the interactive paper 70.

In one example of a making an interactive page 70, the first level of printing is conductive ink, beginning as rectangles (i.e., conductive pads 64) at each of the pre-punched holes or apertures 62 and continuing as lines to the locations of the touch points 60. A negative of that conductive pattern may then be printed to maintain an even surface. Next, white ink is printed over the entire page 70, leaving the conductive rectangles and touch points exposed. A final printing sequences provides the indicia (text, graphics or the like) on the surface of the page 70. The ink coats the inside of the apertures 62 to make positive contact with the pins 36.

Fifteen of the pins 36 which hold the pages of interactive paper 70 in place on the platform 34 are made of a conductive material. Fourteen of these conductive pins 36 can carry impulse signals from any number of the interactive paper pages 70. The signals are carried to a small remote transmitter within the transmitter unit 40. The transmitter unit 40 also provides the battery power which is transferred to every page of interactive paper 70 through the central pin 90.

As all of the pins 36 and 88 are molded into the platform housing 38, which is integrally formed with the back cover 78, a variety of back covers and corresponding platforms 34 may be provided, containing different lengths of pins to allow for the publishing of binders 32 of different thicknesses.

When fully assembled, each page of the interactive paper 70 is provided electrical power through the power plug 46 which interconnects the power source with the central pin 90. The base sheet material 110 of the interactive paper pages 70 may contain indicia which prompt a user to place a finger, bare or covered with a conductive material, over a selected touch point 60. The finger itself or a conductive covering worn on the fingertip completes the circuit or circuits exposed at the touch point 60, sending a signal through the respective conducted pins 36, the pin connection lines 54 and the circuit output housing 92, and from thence through the multi-pin connector 44 to the transmitter unit 40, which will then transmit an appropriate signal to a selected multimedia component 42 where additional audio, video or data-based information may be instantly accessed and displayed to, as mentioned previously, support the indicia 112 on the selective page of the interactive paper 70. The transceiver unit 40 is electronically connected to at least one binder 32, for providing power to the at least one binders and transmitting/receiving signals to provide two-way communication between the remote multimedia source 42 and the binder 32 such that selection of a particular touch point 60 by a user electronically connects the distinct circuit 58 associated with the particular touch point 60 and the remote multimedia source 42, the output from the remote multimedia source 42 associated with input sent to the remote media source 42 by the selection of the particular touch point 60.

A feedback unit 116 is electronically connected to the remote multimedia source 42 for displaying output from the remote multimedia source 42. The remote multimedia source 42 may display output on a computer monitor 118 connected to the multimedia source 42. However, the multimedia source 42 may not be located within visual range of the person using the binder 32. The feedback unit 116 allows the output from the multimedia source 42 to be displayed to the person using the binder 32. One form of the feedback unit 116 may be a wall display 120 electronically connected to the remote multimedia source 42 and at least one binder 32 for displaying indicia such as text, graphics (animations, streaming video, countdown timers, etc.) or the like to a room full of people including those using binders 32. Alternatively, the feedback unit 116 may be a binder display 122 electronically connected to the transceiver unit 40 for displaying output from the multimedia source display (i.e., a small display mechanically connected to the binder 32 and electronically connected to the transceiver unit 40 for displaying indicia such as text, graphics (animations, streaming video, countdown timers, etc.) or the like). In yet another alternative, the feedback unit 116 may use both a wall display 120 and one binder display 122 for every binder 32 participating in an activity. The binder display 122 includes an on/off switch 123 and a plug 125 for electronic and/or mechanical connection to a receptacle 127 in the transceiver unit 40. For example, the wall display 120 could display a first graphic such as an animation, streaming video, icon or a combination thereof, a second graphic such as a countdown timer, while the binder display 122 could display text.

A small track ball 128 can be plugged into the transceiver unit 40. When plugged in, the track ball 128 allows the user to control the on-screen cursor, with the index finger of the user's hand. The track ball 128 includes a push-button 130 switch which can be activated with the thumb of the user's hand. The track ball 128 can perform mouse functions including selecting, clicking, dragging, opening windows, pulling down menus, drawing simple shapes, saving, printing, etc.

The transceiver unit 40 that instantly sends a radio-frequency signal to the remote multimedia source 42, such as a computer, can easily be removed from a binder 32 and snapped onto any other binder 32. This limits the need for circuitry within the binders 32 themselves to the link between the conductive pins 36 and the pin connector 44. The power and circuitry for transmitting and receiving data is located within the transceiver unit 40 itself. Each transceiver unit 40 has its own identity, established at the time of manufacture and there is no need for the transceiver units 40 to use different frequencies for multiple binder applications. Every transceiver unit 40 has built-in two-way communication capability, allowing a plug-in feedback unit 116 to be connected to any binder 32. This is important for uses such as medical applications where feedback verification is essential. When touch points 60 on interactive pages 70 are touched, a light (e.g., light-emitting diode) 103 and beeper 104 on the transceiver unit 40 are instantly activated, indicating to the user that a signal has been sent to the multimedia source 42. The volume of the sound produced by the beeper 104 can be reduced or the beeper 104 turned off completely. The transceiver unit 40 further includes a built-in microphone 105 which allows for the transmission of the user's voice to the multimedia source 42 and used in applications such as recording one or more voices, connecting to a two-way wireless phone link, connecting to a two-way Internet link, responding to test questions (using voice recognition technology), using voice-recognition for word processing, triggering various computer functions, etc.

The binders 32 and transceiver unit(s) 40 of the system 30 can be set up in a number of ways to meet the needs of the users. For example, at a minimum, a single binder 32 can be connected to a transceiver unit 40 in order to connect the binder 32 to the multimedia source 42. Alternatively, at least one transceiver unit 40 can be electronically connected to a number of binders 32. In another alternative, the at least one transceiver unit 40 can be electronically connected to a particular one of the binders 32 with the remaining binders 32 electronically connected to the particular one of the binders 32. In another example, each binder 32 may be electronically connected to a particular transceiver unit 40. In a classroom setting, for example, an instructor may have an instructor binder 32 and associated transceiver unit 40 while each student has their own individual binder 32 and transceiver unit 40.

The LAN hub 114 establishes the remote link between the interactive binders 32 and the remote multimedia source 42. The LAN hub 114 also sends data back to the feedback units 116 and audio signals to audio-devices 124, such as earpieces or headphones electronically and/or mechanically connected to the transceiver unit 40. The audio device 124 allows audio testing in a classroom and allows each student to hear one of several audio tracks for the same question and not know what other students are hearing.

Figure 12:
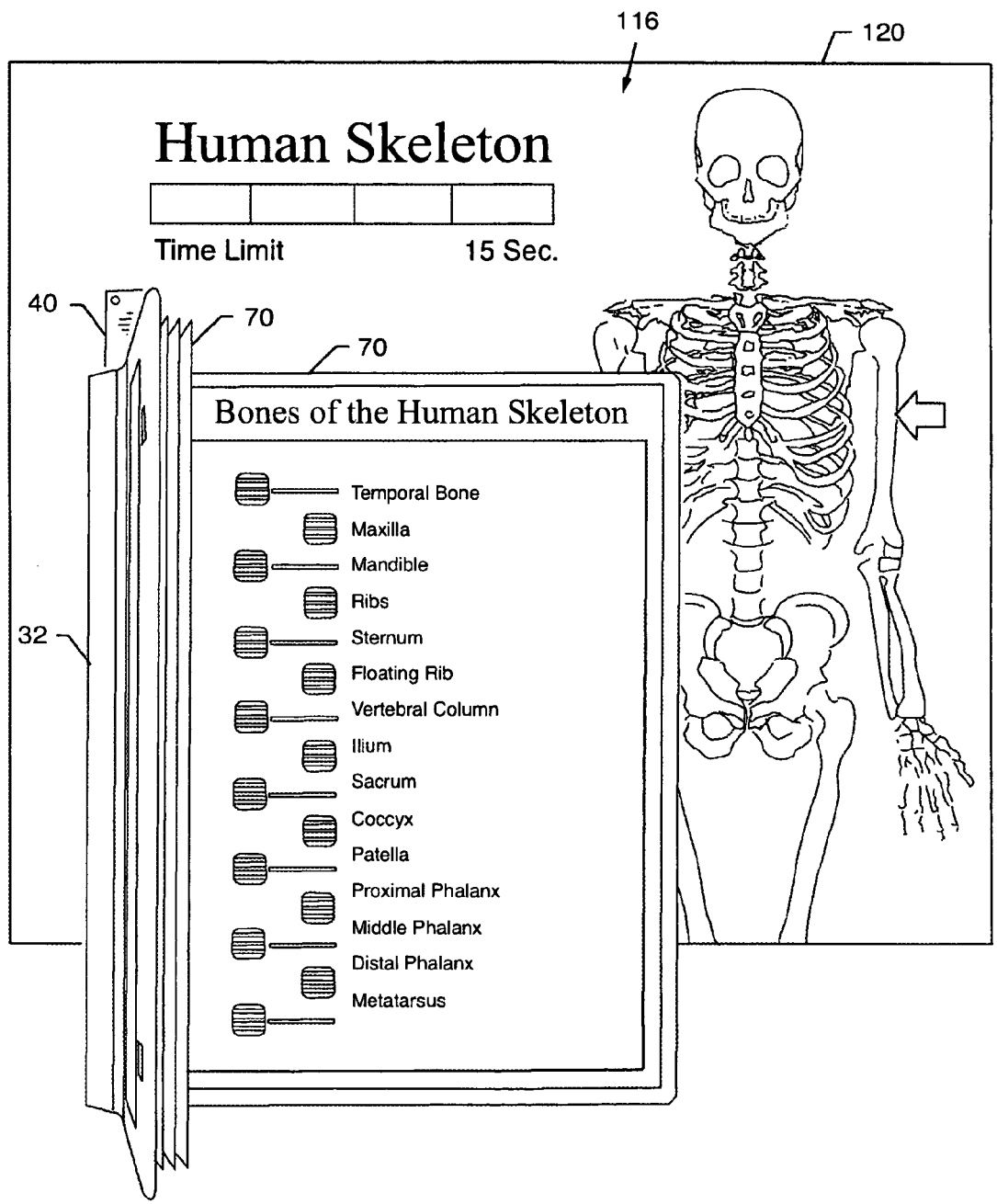
FIG. 12 illustrates a perspective view of a binder, transceiver and interactive in the foreground and a wall display in the background embodying the present invention.

As mentioned above, a bare finger, a finger with a conductive covering worn on the fingertip (e.g., a finger sleeve) or hand-held stylus with a conductive tip 126 completes the circuit or circuits exposed at the touch point 60. The conductive coverings and stylus can come in a variety of shapes, colors or the like. The use of finger sleeves or a hand-held stylus 126 is preferable over the use of a finger as the finger sleeve/stylus has a higher level of conductivity than a human finger. The higher conductivity allows the conductivity level of the printed lines on the pages 70 to be less, so that touch points 60 are not inadvertently triggered by a person's hand as the binders 32 are handled. In use, the finger sleeve or conductive tip 126 can be used to contact at least one of the touch points 60 in response to indicia displayed on the feedback unit 116. For example, a wall display 120 in a classroom may be showing a human skeleton, as seen in FIG. 12. A teacher, using an instructor binder 32, may user a stylus 126 to select a touch point 60 on the interactive page 70 in the instructor binder 32 corresponding to one of the bones of the human skeleton. With the stylus 126 closing the distinct circuit 58 associated with that bone, the transceiver unit 40 of the instructor binder 32 sends a signal to the multimedia source 42 which processes the signal and sends output to the wall display 120 which highlights the bone selected by the instructor. There may be several students in the classroom and each equipped with their own student binder 32. Each student then selects a touch point 60 on the appropriate interactive page 70 in their own binder 32 that the student believes correctly identifies the bone highlighted by the instructor. A countdown timer graphic on the wall display 120 indicates to the student how much time they have to respond to the question. If the students have a binder display 122 connected to their binders 32, the multimedia source 42 can indicated whether or not the student's response was correct, if the student answered the question in time, etc.

Alternatively, the binder 32 and transceiver unit 40 can each be covered with a clear plastic label holder (not shown) that can be snapped onto the spine of the binder 32/transceiver unit 40. The label holder contains a printed paper label that can identify binder publications or provide custom labeling of binders to identify certain subjects contained on the interactive paper 70 in the binders 32 or identify the user of a particular binder 32 or transceiver unit 40.

In accordance with another embodiment of the system 30, as seen in FIGS. 15–24, a second embodiment of the present invention includes a number of electronic binders 132. Each binder 132 includes a platform 134 which includes a plurality of conductive pins 136 that extend from a platform housing 138, up to four of the pins 136 can be used for game play. Each binder 132 is similar to the binder 32 described above with respect to FIGS. 1–14 and utilizes the same basic configuration of the conductive pins 136 relative to the platform 134, and a removably attachable transceiver unit 140 as noted above. The binder 132, as illustrated, provides an interactive platform that is a table-top gateway to a multitude of games and learning activities for use in conjunction with a multimedia source 150, in the form of a personal computer (connectable to the Internet in order to access a website or participate in an on-line game in Battle.net), CD-ROM or the like. A wireless-LAN hub 151, similar to the LAN hub 114, is connected to the remote multimedia source 150. CD ROM software discs (not shown) containing game programs and website downlink data are located within the remote multimedia source 150.

The primary difference between the binder 132 and the binder 32 is the substitution of a hinged lid 142 for the housing cover 72. The lid 142 is connected to the platform 134 by means of a hinge 144 which permits the lid 142 to be pivoted between an open position (FIG. 18) and a closed position (FIG. 17). The lid 142 includes a handle 146 that facilitates moving the lid 142 between the open and closed positions. On one side of the lid 142 there are provided a plurality of pin receiving recesses 148 which correspond to the upper ends of the conductive pins 136. When the lid 142 is pivoted into its closed position, the upper ends of the conductive pins 136 are received within the pin receiving recesses 148. This serves to secure an adjacent portion of a fixed, preferably planar, medium 174, between the platform housing 138 and the lid 142. In virtually all other aspects, the binder 132 is similar in construction and operation with the binder 32.

The transceiver unit 140 is virtually identical in structure and operation to the transceiver unit 40. The only noticeable difference between the transceiver units 140 and 40 is the inclusion of an on/off switch 152 and a key pad 154. Thus, when the transceiver unit 140 is attached to the platform 134 by inserting the snap-on connectors 156 (similar to the snap-on connectors 106) on the bottom of the transceiver unit 140 through the receiving apertures 158 (similar to the receiving apertures 108) on the top of the binder 132, the multi-pin connector 160 and the power plug 162 are received within the respective receptacles 164 and 166. When so connected, electricity from the batteries (not shown) is provided through the power plug 162 to the central pin 168, and each of the remaining fourteen conductive pins 136 are electrically connected to the transceiver (not shown) within the transceiver unit 140 through the multi-pin connector 160, the circuit output housing 170 and the pin connection lines 172.

The binder 132 includes at least one fixed planar medium 174 which includes a printed circuit board assembly 176 which defines a game or activity board that may be utilized with the platform 134. Like the interactive paper 70, an edge of the assembly 176 is provided with apertures 178 through which the conductive pins 136 are inserted. When the lid 142 is closed, the assembly 176 is locked in place. The assembly 176 includes a central printed circuit board 180 which includes the apertures 178 along one edge that are at least partially surrounded by conductive contact pads 182, a power circuit 184 and output circuits 186. The printed circuit board 180 further includes a number of touch points 188 wherein portions of the power and output circuits 184, 186 are exposed.

With the lid 142 of the platform 134 opened, the conductive pins 136 are exposed. A game board 174 can then be placed on the pins 136 and secured by the lid 142. In this way, the circuits 186 and conductive pins 136 are electrically connected, making it possible for the signals from the touch points 188 to be transmitted.

An upper laminate sheet 190 overlies the printed circuit board 180, and a lower laminate sheet 192 underlies the printed circuit board 180. The sheets 190, 192 are approximately ⅛ inch thick, and include die cut apertures 194 that are located to correspond with the touch points 188. The apertures 194 define recessed touch points 188 which are configured to receive a portion of a play piece 196 therein. The game board may be double-sided with apertures 194 located on both sides of the game board corresponding to a number of touch points 188. Each side may have a totally different game or each side may be two versions of the same game, such as Easy and Difficult versions. Since the system 30 is connected to the multimedia source 140, the system 30 is capable of combining board games with video games.

Figure 20:
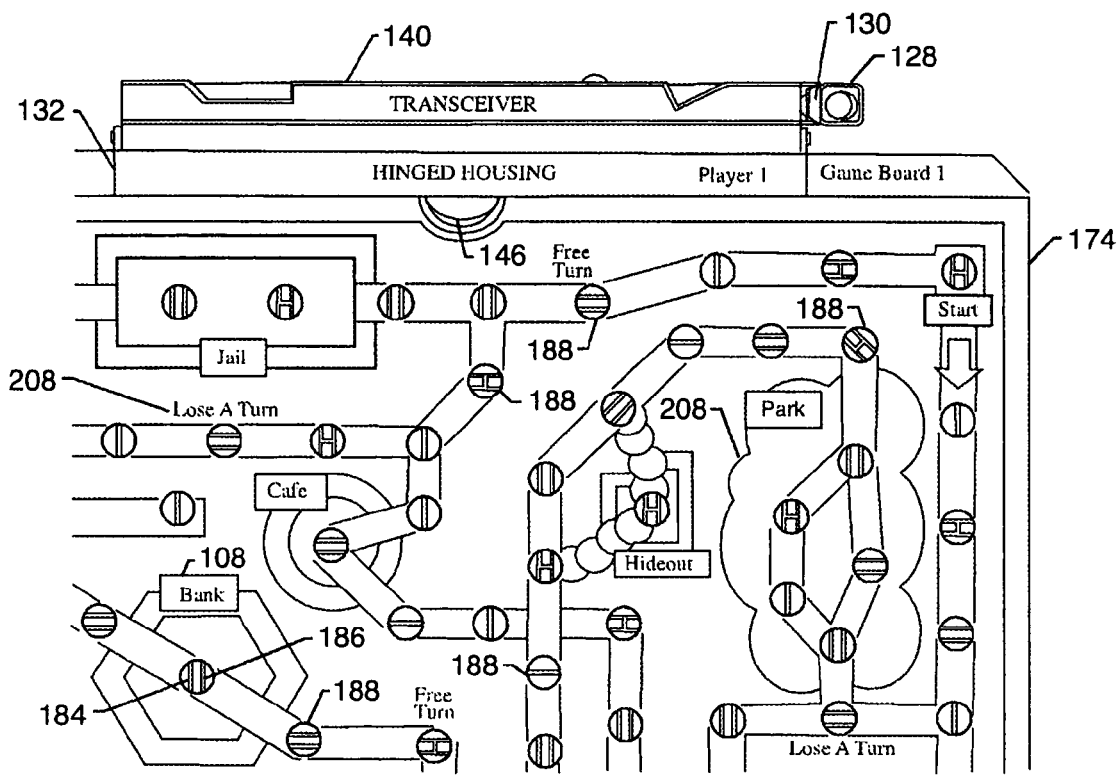
FIG. 20 illustrates a top plan view of a first player binder, transceiver and game board embodying the present invention.
Figure 21:
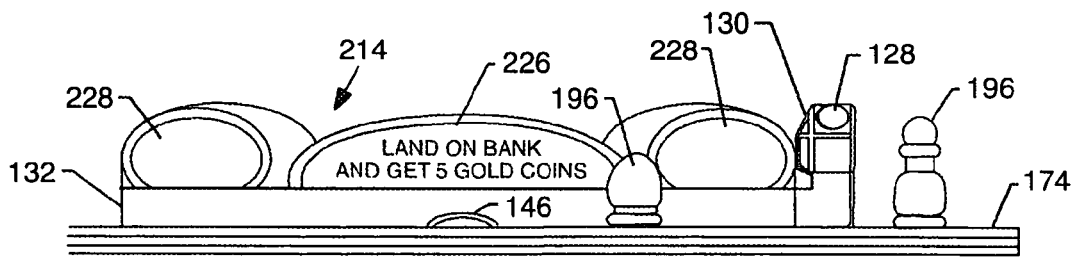
FIG. 21 illustrates a side elevational view of the first player binder, transceiver and game board of FIG. 20, including a feedback unit incorporating speakers and a display embodying the present invention.
Figure 22:
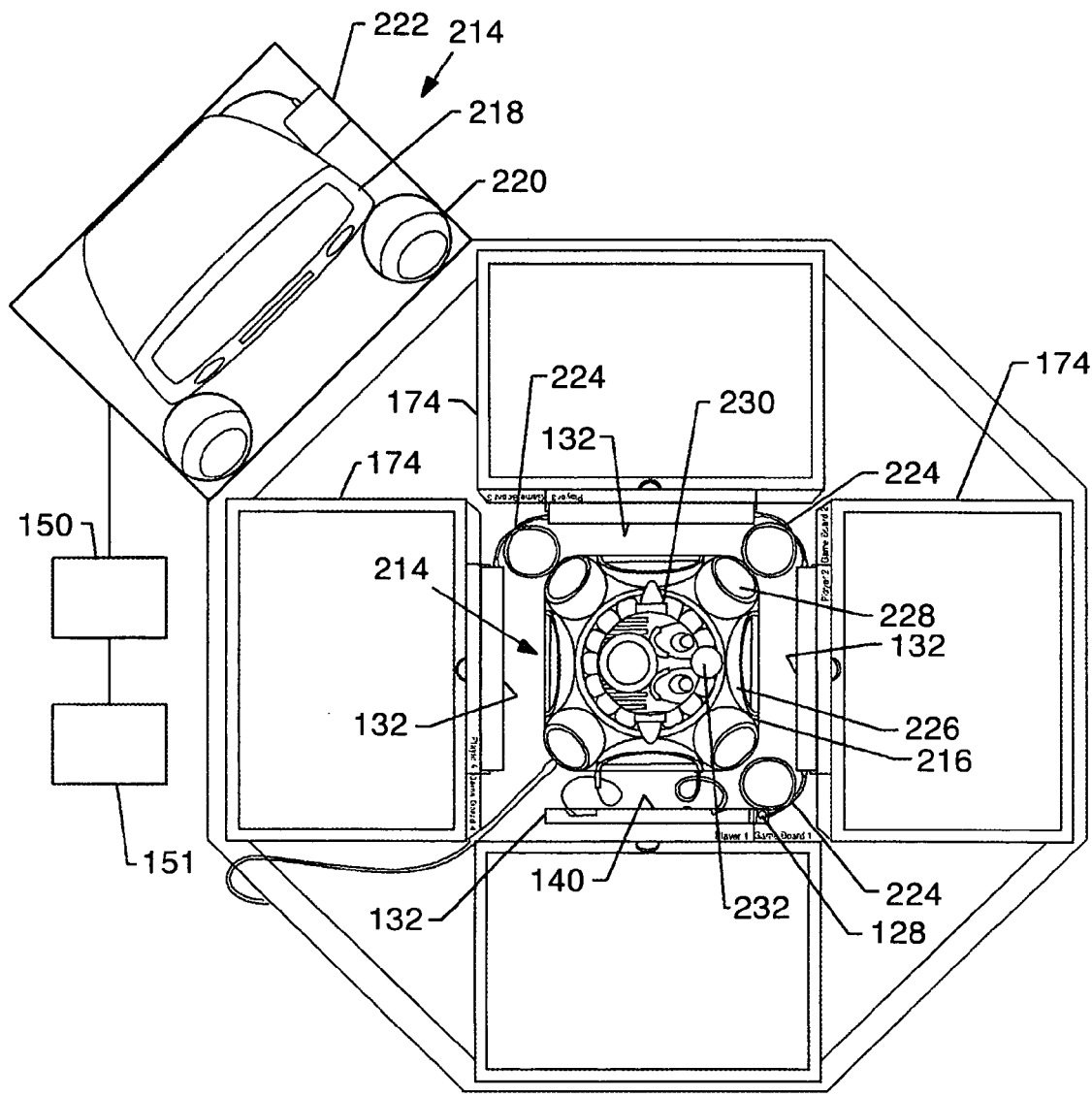
FIG. 22 illustrates a top plan view of a four player game set-up embodying four binders, a transceiver, game boards, computer and robotic stage embodying the present invention.

With reference to FIGS. 15 and 20, the construction of the assembly 176 will be described. The sample layout of the surface of the game board can contain any desired number of separate touch points 188. The printed circuits leading the touch points 188 have the same value, but in the illustrations the circuits are of different gradation only to separate them visually.

The printed circuit board 180 includes a base sheet of material 198 on which two printed circuit tracks are laid down. One such track is the power circuit 184 which extends from the conductive contact pad 182 surrounding the central pin 168. The other track is the output circuit 186 that provides an output line from every touch point 188. The output circuits 186 are preferably routed through only pins 1 and 2 (FIG. 23). In this regard, many of the games to be played on the binder 132 are designed for as many as four players. In the same assembly 176 layout, each of the four game boards will appear identical when finished, except for a number in a corner of the game board. The method for the binder 132 to distinguish between game boards and players is implemented during the first printing. Pins 1 and 2 are used to customize each game board so that each board will transmit a completely different set of codes to the transceiver unit 140.

For example, game board one would route the output circuit 186 from each touch point 188 through pin 1. Game board 2 would route the output circuit 186 through pin 2 only. Game board 3 would route the output circuit 186 from each touch point 188 through both pins 1 and 2. Game board 4 would route the output circuit 186 from each touch point 188 through neither pin 1 nor pin 2. In other words, every code transmitted from board 1 will always include pin 1 and never include pin 2. Board 2 transmissions always include pin 2 and never pin 1. Board 3 always includes both pins 1 and 2. Board 4 never uses either pin 1 nor pin 2. This arrangement allows a processor in the multimedia source 150, such as a computer, receiving signals from the transceiver unit 140 to distinguish between the four transmissions sent by a single transceiver unit 140, and identify the each player and the one of the four game boards that is assigned to that player. The transceiver 140 communicates movements of the play pieces 196 to the multimedia source 150 and receives various responses from the software within the multimedia source 150. A track ball and/or computer mouse (not shown) can be connected to the transceiver 140 to control on-screen computer functions through the transceiver 140. In this way, different games or different levels of difficulty or other options can be selected.

After the first printing, all subsequent printings on the base sheet 134 are identical on all boards. The second printing is an insulation layer which covers the printed circuit tracks for the power circuit 184 and the output circuit 186 leading to the different touch points 188. Only small dots of conductive material at each touch point 188 are left exposed. The insulation provides a clean surface so that additional printed circuits will not make contact with the first printing.

A third printing of conductive material 202 connects the touch points 188 to pins 3–9 of the conductive pins 136. This process begins to provide a separate identity for each touch point 188. Notably, the third printing of conductive material 202 connects the touch points 188 to pins other than pins 1 and 2. The fourth printing is insulation (not shown) that allows the next level of printing to be overlaid without contacting the previous circuit of the third printing 202. The fifth printing (not shown) connects the remaining conductive pins 136 to the touch points 188. The circuits of the fifth printing are predominantly horizontal, and in combination with the circuits 202 of the third printing form a variation on an X-Y grid. The fifth printing on the base sheet 198 completes the process of giving each touch point 188 a separate identity. Thus, the full identity of a touch point 188 on board 1 might consist of a pin combination that is different from the pin combination of the same touch point 188 on board 2, the same touch point 188 on board 3, and the same touch point on board 4.

With the completion of the printed circuit board 180, the assembly 176 is finished when the die-cut overlays 190, 192 are laminated onto the printed circuit board 180. The overlays 190, 192, as mentioned previously, include die-cut apertures 194 which frame each touch point 188. The apertures 194 prevent the inadvertent triggering of touch points 188. Conductive play pieces 196 are utilized to activate the touch points 188. The overlays 190, 192 also contain printed indicia 208 including, without limitation, text, graphics, colored circles or the like which define the configuration of each game.

The variety of games and inter-activities that can be played on the binder(s) 132 are unlimited. New character lines and well-known properties can provide the basis for binder 132 products of all kinds. Traditional games can also be adapted to this interactive format.

From a marketing viewpoint, the theming of such new translations is critical to establishing the highest level of visual quality and recognizability. One aspect of such theming is the representation of characters as play pieces 196. Character pieces, both conductive and non-conductive, can provide an exciting continuity with the graphics on the assembly 176.

The touch points 188 on the assembly 176 are recessed at the bottom of ⅛ inch deep holes, which are die-cut into the laminations 190, 192. Rather than touching the touch points 188 with the tip of a finger, each player uses a conductive play piece 196 which fits into the apertures 194.

Each play piece 196 includes a housing 210 and a conductive tip 212 for contacting the touch points 188 at the bottom of the apertures 194. The play piece 196 includes a plunger (not shown) vertically movable relative to the housing 210 and a spring (not shown) that biases the plunger upwardly relative to the housing 210, as seen in FIG. 19. When the spring-loaded top of the play piece 196 is pushed down, the conductive tip 212 extends down and makes contact with the touch point 188. When the top of the play piece 196 is released, the tip 212 springs back up, so the contact is not maintained. This configuration prevents the accidental triggering of touch points 188 by a player inadvertently placing a hand on the surface of the game board. In another alternative, the play pieces 196 may also be provided with a circuit (not shown) connecting a central conductive point of the conductive tip 212 that is to an outer conductive ring that is spaced from the central point. A resistor (not shown) is placed within the circuit to provide a means of identifying the particular play piece 196 electronically. When the tip 212 of the play piece 196 makes contact with a touch point 188, electricity flows through the central conductive point, the resistor and out through the outer ring where it makes contact with the touch point 188. Each play piece 196 for a specific game would have a different level of resistance as determined by the resistor. Thus, each play piece 196 could easily be identified by the system 30. When the spring-loaded plunger is pushed down, its conductive tip 212 extends down and makes contact with the printed touch point 188. When the top of the plunger is released, the tip 212 springs back up, so the contact is not maintained. The configuration of the assembly 176 prevents the accidental triggering of touch points 188 by a player inadvertently placing a hand on its surface.

Of course, the binder(s) 132 can be adapted to be utilized in many different configurations with only one player or up to four players. For example, a feedback unit 214, in the form of a robotic stage 216 can be connected to several binders 132 to provide an interface between multiple game boards 176 and provide output from the multimedia source 150. In one example, the robotic stage 216 is electronically connected to the multimedia source 150 through the transceiver unit 140. The multimedia source 150, in the form of a computer, includes feedback units 214 in the form of a computer monitor 218, speakers 220 for providing an audio output from the remote multimedia source 150, and a computer mouse 222.

The robotic stage 216 is electronically and mechanically connected to the transceiver unit 140 which is connected to one of the binders 132. Audio cables connect the transceiver unit 140 and the stage 216 for sounds and animation signals and a feedback cable connects the transceiver 140 and stage 216 for displaying messages or the like on the stage 216. The binders 132 are serially electronically connected by cables 224 such that the binder 132 of player 1 is electronically connected by a cable 224 to the binder 132 of player 2, which is in turn electronically connected by a cable 224 to the binder 132 of player 3, which is electronically connected by a cable 224 to the binder 132 of player 4. The movement of the game pieces 196 on the game boards of each binder 132 generates signals which pass through the cables 224 and are sent to the multimedia source 150 by the transceiver 140. The software program at the multimedia source 150 recognizes how many game boards are placed in the binders 132 and structures the interactive game play for that many players. The robotic stage 216 has four sides with a feedback display 226 on each side and one speaker 228 positioned at each corner of the robotic stage 216 for providing an audio output from the remote multimedia source 150. A central turntable (not shown) is located at the center of the robotic stage 216 and an object to be rotated 230, such as a robotic animated figure (e.g., a clown head is seen from above in FIG. 22) connected thereto, allowing the FIG. 230 to rotate left and right to face each player. The bottom of the turntable contained an elevated triangle with a pin connector (not shown). Each robotic FIG. 230 has a pin connector (not shown) for mating with the pin connector of the turntable. The robotic stage 216 is positioned such that the appropriate feedback display 226 is positioned in front of the appropriate user (i.e., the feedback display 226 for player 1 is positioned in front of the binder 132 of player 1). The feedback display 226 for provides an output from the remote multimedia source 150 in the form of indicia, including graphics, text messages, etc. Various game set-ups can be played that include one to four players, with or without the robotic stage 216, computer monitor 218, speakers 220, and/or computer mouse 222.

The speakers 228 of the robotic stage 216 provide the voice of the animated FIG. 230, which is synchronized with the animation on the feedback unit 214. As the animated FIG. 230 turns from player to player, the voice seems to follow, because the volume of sound is increased or decreased from one speaker to the next. When the FIG. 230 comes to rest in front of one player, the sound has become balanced between the two speakers 228 in front of that player. This makes it sounds as though the voice is coming directly from the FIG. 230. As the FIG. 230 is speaking, the other speakers 228 may play background sound effects, providing stereo quality and sound layering. The computer speakers 220 next to the computer monitor 218 can add yet another sound dimension as the voice generated by the multimedia source 150 can seem to travel from the monitor screen 218 to the stage 216 through volume changes. In another example, a figure displayed on the computer monitor 218 could 'talk' to the FIG. 230 on the robotic stage 216.

The computer monitor 218 and/or the feedback display 226 displays all of the visuals that support the single or multiple player games including, without limitation, film and video segments, cell animation effects, computer animation effects, maps, graphs, diagrams, clues, messages, secret codes, printed questions, printed responses and answers, time lines and clocks, player's names, player's scores, records of past games, promos of other games, etc. The display surface of the feedback display 226 is recessed so that other players can not see what is displayed.

The robotic stage 216 further includes a device 232 for emitting an odor in response to output from the remote multimedia source 150. The odor-emitting device 232 may be located in the clown head 230 with appropriate orifices located in the clown head 230 to allow the odor to be directed to an appropriate player. The clown head 230 will turn to face the appropriate user to whom the odor will be directed and release the odor when the head 230 is in position.

Alternatively, the robotic stage 216 would contain retractable cords with plug-in connectors that would be plugged into the receptacles of each platform 134. The transmitter unit 140 would then be snapped onto the robotic stage 216, and the outputs from all binders 132 could then be combined into a single transmission from the transmitter unit 140.

In the alternative, headphones (not shown) can be used by as many as four players when the robotic stage 216 is not connected to replace the speakers 228 of the stage 216.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. An interactive binder and platform system, comprising:
    a remote multimedia source;
    a feedback unit electronically connected to the remote multimedia source for displaying output from the remote multimedia source;
    a plurality of binders, each binder including a plurality of conductive pins and at least one fixed medium having a plurality of distinct circuits operatively connected to the binder and a plurality of touch points defining exposed portions of the distinct circuits; and
    at least one transceiver electronically connected to at least one of the binders, for providing power to the at least one of the binders and transmitting/receiving signals to provide two-way communication between the remote multimedia source and the binders such that selection of a particular touch point by a user electronically connects the distinct circuit associated with the particular touch point and the remote multimedia source, the output from the remote multimedia source associated with input sent to the remote media source by the selection of the particular touch point:
    wherein the feedback unit includes a wall display and a binder display, the binder display providing a message relating to the touch point selected by the user in response to indicia shown on the wall display.

2. The interactive binder and platform system of claim 1, wherein the fixed medium includes a plurality of apertures corresponding to the plurality of conductive pins, wherein each aperture is at least partially surrounded by a conductive contact pad that engages a respective pin inserted through the aperture.

3. The interactive binder and platform system of claim 1, wherein the fixed medium comprises interactive paper having the distinct circuits and power circuits printed therein.

4. The interactive binder and platform system of claim 1, wherein the fixed medium comprises a printed circuit board and an overlying laminate having apertures therethrough corresponding to at least one of the plurality of touch points.

5. The interactive binder and platform system of claim 4, wherein the fixed medium includes an underlying laminate adjacent to the printed circuit board opposite the overlying laminate, the underlying laminate including apertures corresponding to at least one of the plurality of touch points.

6. The interactive binder and platform system of claim 4, including a play piece at least partially positionable within one of the apertures of the laminate of the fixed medium, the play piece including a housing and a conductive tip configured to engage an underlying touch point to complete the corresponding distinct circuit.

7. The interactive binder and platform system of claim 1, wherein the binder includes a hinged lid adjacent to the plurality of conductive pins, the hinged lid including a plurality of recesses corresponding to upper ends of the plurality of conductive pins and being pivotable between an open position and a closed position wherein the upper ends of the plurality of conductive pins are captured within the plurality of recesses of the lid.

8. The interactive binder and platform system of claim 1, wherein the transceiver and remote multimedia source are operationally connected through a wireless local access network.

9. The interactive binder and platform system of claim 1, wherein the feedback unit comprises a wall display electronically connected to the remote multimedia source and at least one binder.

10. The interactive binder and platform system of claim 1, wherein the feedback unit comprises a binder display, electronically connected to the transceiver, for displaying output from the multimedia source.

11. The interactive binder and platform system of claim 1, wherein the remote multimedia source includes a computer.

12. The interactive binder and platform system of claim 11, wherein the computer is electronically connected to a website.

13. The interactive binder and platform system of claim 1, wherein the remote multimedia source includes a CD-ROM player.

14. The interactive binder and platform system of claim 1, wherein the at least one fixed medium is removable from the binder.

15. The interactive binder and platform system of claim 1, including a conductive tip for contacting at least one of the touch points in response to indicia on the wall display; wherein the indicia includes a first graphic generated by the remote media source and appearing on the wall display, and the binder display shows a text message indicating whether or not the at least one of the touch points is associated with the first graphic.

16. The interactive binder and platform system of claim 15, wherein the first graphic comprises an animation.

17. The interactive binder and platform system of claim 15, wherein the first graphic comprises a streaming video.

18. The interactive binder and platform system of claim 15, including a second graphic comprising a countdown timer graphic indicating time remaining for a user to contact at least one of the touch points in response to the indicia.

19. The interactive binder and platform system of claim 1, wherein the at least one transceiver is electronically connected to all of the binders.

20. The interactive binder and platform system of claim 1, wherein the at least one transceiver is electronically connected to a particular one of the binders, the remaining binders electronically connected to the particular one of the binders.

21. The interactive binder and platform system of claim 1, wherein each binder is electronically connected to a particular transceiver.

22. The interactive binder and platform system of claim 1, wherein the fixed medium includes indicia associated with each touch point.

23. The interactive binder and platform system of claim 1, including a conductive tip for contacting at least one of the touch points in response to indicia on the feedback unit.

24. An interactive binder and platform system, comprising:
a remote multimedia source;
a feedback unit electronically connected to the remote multimedia source for displaying output from the remote multimedia source;
an instructor binder electronically connected to the remote multimedia source and at least one student binder electronically connected to the remote multimedia source, each binder including a plurality of conductive pins and at least one fixed medium having a plurality of distinct circuits operatively connected to the binder and a plurality of touch points defining exposed portions of the distinct circuits; and
at least one transceiver electronically connected to the instructor binder and the at least one student binder, for providing power to the at least one of the binders and transmitting/receiving signals to provide two-way communication between the remote multimedia source and the binders such that selection of a particular touch point by a user electronically connects the distinct circuit associated with the particular touch point and the remote multimedia source, the output from the remote multimedia source associated with input sent to the remote media source by the selection of the particular touch point;
wherein the feedback unit includes a wall display and a binder display, the binder display providing a message relating to the touch point selected by the user in response to indicia shown on the wall display.

25. The interactive binder and platform system of claim 24, wherein the fixed medium comprises interactive paper having the distinct circuits and power circuits printed therein.

26. The interactive binder and platform system of claim 24, including a track ball electronically connected to the instructor binder for manipulating the remote multimedia source.

27. The interactive binder and platform system of claim 24, wherein the feedback unit comprises a wall display electronically connected to the remote multimedia source and at least one of the binders.

28. The interactive binder and platform system of claim 24, wherein the feedback unit comprises a binder display, electronically connected to the transceiver, for displaying output from the multimedia source.

29. The interactive binder and platform system of claim 24, including a conductive tip for contacting at least one of the touch points in response to indicia on the wall display; wherein the indicia includes a first graphic generated by the remote media source and appearing on the wall display, and the binder display shows a text message indicating whether or not the at least one of the touch points is associated with the first graphic.

30. The interactive binder and platform system of claim 29, including a second graphic comprising a countdown timer graphic indicating time remaining for a user to contact at least one of the touch points in response to the indicia.

31. The interactive binder and platform system of claim 24, wherein the at least one transceiver comprises a plurality of transceivers and each transceiver is electronically connected to a particular one of the plurality of binders.

32. The interactive binder and platform system of claim 24, wherein each instructor and student binder is electronically connected to the remote multimedia source through a wireless local access network.

33. The interactive binder and platform system of claim 24, wherein the feedback unit is electronically connected to the transceiver for displaying output from the multimedia source.

* * * * *